United States Patent
Cao et al.

(10) Patent No.: US 12,498,291 B2
(45) Date of Patent: Dec. 16, 2025

(54) DAMAGE IDENTIFICATION METHOD FOR CANTILEVER BEAM BASED ON MULTIFRACTAL SPECTRUM OF MULTI-SCALE RECONSTRUCTED ATTRACTOR

(71) Applicants: Hohai University, Nanjing (CN); Jiangxi University of Science and Technology, Ganzhou (CN); JSTI GROUP, Nanjing (CN)

(72) Inventors: Maosen Cao, Nanjing (CN); Dayang Li, Nanjing (CN); Tongfa Deng, Ganzhou (CN); Dragoslav Sumarac, Nanjing (CN); Ganggang Sha, Nanjing (CN); Yufeng Zhang, Nanjing (CN); Emil Manoach, Nanjing (CN); Zeyu Wang, Nanjing (CN)

(73) Assignees: Hohai University, Nanjing (CN); Jiangxi University of Science and Technology, Ganzhou (CN); JSTI GROUP, Nanjing (CN)

( * ) Notice: Subject to any disclaimer, the term of this patent is extended or adjusted under 35 U.S.C. 154(b) by 351 days.

(21) Appl. No.: 18/144,868

(22) Filed: May 9, 2023

(65) Prior Publication Data
US 2023/0358631 A1    Nov. 9, 2023

(30) Foreign Application Priority Data
May 9, 2022   (CN) .......................... 202210498306.9

(51) Int. Cl.
G01M 7/02       (2006.01)

(52) U.S. Cl.
CPC .................................... *G01M 7/02* (2013.01)

(58) Field of Classification Search
None
See application file for complete search history.

(56) References Cited

FOREIGN PATENT DOCUMENTS

| CN | 106197910 A | * | 12/2016 | .......... G01M 5/0066 |
|----|-------------|---|---------|------------------------|
| CN | 110702786 A | * | 1/2020  | ............ G01N 29/44 |
| WO | WO-03038666 A1 | * | 5/2003 | ............... G07F 7/08 |

OTHER PUBLICATIONS

Lin, Liu, and Liu, "Study of the Non-Liner Dynamic System Theory for Reciprocating Compressor Fault Diagnosis" (ICCASM 2010) (Year: 2010).*

* cited by examiner

*Primary Examiner* — Lisa M Caputo
*Assistant Examiner* — Cynthia L Davis
(74) *Attorney, Agent, or Firm* — Nitin Kaushik

(57) ABSTRACT

A damage identification method for a cantilever beam based on a multifractal spectrum of a multi-scale reconstructed attractor includes: acquiring an original acceleration signal of the cantilever beam by a dynamic measurement system, performing stationary wavelet decomposition on a pretreated acceleration signal to obtain multi-scale sub-signals, selecting the multi-scale sub-signal that can represent main vibration characteristics of the cantilever beam for phase space reconstruction and normalization to obtain a normalized multi-scale reconstructed attractor, constructing the multifractal spectrum of the multi-scale reconstructed attractor, establishing a damage index based on a singularity index of the multifractal spectrum, and identifying and locating damage of the cantilever beam according to a relative numerical value of the damage index. The method can quantify structural damage characteristics in multi-scale phase space domain from the perspective of multifractal, and provide the simple, rapid and accurate damage identification method for cantilever beam.

9 Claims, 4 Drawing Sheets

DAMAGE IDENTIFICATION METHOD FOR CANTILEVER BEAM BASED ON MULTIFRACTAL SPECTRUM OF MULTI-SCALE RECONSTRUCTED ATTRACTOR

CROSS REFERENCE TO THE RELATED APPLICATIONS

This application is based upon and claims priority to Chinese Patent Application No. 202210498306.9, filed on May 9, 2022, the entire contents of which are incorporated herein by reference.

TECHNICAL FIELD

The present invention relates to the technical field of structural damage diagnosis, in particular to a damage identification method for a cantilever beam based on a multifractal spectrum of a multi-scale reconstructed attractor.

BACKGROUND

In service, the beam structure is subjected to long-term effects of complex environmental loads, and the internal materials are gradually aging, which inevitably leads to structural damage. The evolution and accumulation of early damage will reduce the bearing capacity of the structure and threaten its operation safety, and even lead to the overall failure of the structure in severe case. Dynamic nondestructive testing of the structure is an important technology to find structural damage in time, which plays an irreplaceable role in ensuring the safety of structural operation. However, a traditional dynamic nondestructive testing method is based on linear theory, which cannot extract nonlinear features that are more sensitive to damage. Particularly, the curvature mode used for damage location needs to differentiate the modal shapes, which greatly reduces the anti-noise ability of the acquired damage index.

A damage detection method based on reconstructed attractor is a new nondestructive detection method for structures with the rapid development of chaos theory, and is being gradually applied to structural damage identification in mechanical and civil fields. The basic principle of the damage detection method is that the existence of damage will lead to the change of dynamic behavior of structural attractor, and then the damage can be identified by comparing the topological differences of response attractors in undamaged and damage states. On the one hand, the existing methods use the structural dynamic response to perform phase space reconstruction directly to obtain the reconstructed attractor, and the damage information and interference noise are not effectively separated before reconstruction, which will lead to a decrease in the accuracy of damage identification. On the other hand, the existing methods pay more attention to the topological differences of the reconstructed attractor, but less attention to the nonlinear dynamic motions of complex systems.

Therefore, the present invention provides a damage identification method for a cantilever beam based on a multifractal spectrum of a multi-scale reconstructed attractor.

SUMMARY

In order to solve the above problems, the present invention separates a damage information part and a noise part in a vibration signal by means of multi-scale analysis, quantitatively describes influence of damage on nonlinear dynamic motions of a structure by means of multifractal analysis, and then establishes a damage index based on multifractal characteristics of a multi-scale reconstructed attractor to evaluate health state of a beam structure and locate the structural damage. Compared with existing methods, a method for a multifractal spectrum of a multi-scale reconstructed attractor established by the present invention breaks through the problems of low identification accuracy, weak damage sensitivity and insufficient anti-noise ability of a damage characterization method for a cantilever beam in the prior art, and provide a simple, rapid and accurate damage identification method for cantilever beams.

The present invention provides the following technical solution.

The damage identification method for cantilever beam based on a multifractal spectrum of a multi-scale reconstructed attractor includes:

acquiring an original acceleration signal of the cantilever beam by a dynamic measurement system, and performing smooth filter preprocessing on the original acceleration signal to obtain a preprocessed acceleration signal;

performing stationary wavelet decomposition on the acceleration signal to obtain multi-scale sub-signals having the same data length;

selecting the multi-scale sub-signal representing vibration characteristics of the cantilever beam for phase space reconstruction and normalization to obtain the multi-scale reconstructed attractor;

forming the multifractal spectrum according to the multi-scale reconstructed attractor; establishing a damage index according to a singularity index of the multifractal spectrum; and identifying a damaged cantilever beam according to a relative numerical value of the damage index.

Preferably, when stationary wavelet decomposition is performed on the acceleration signal, a wavelet basis function is rbio2.4, and the wavelet decomposition level is 3.

Preferably, the step of selecting the multi-scale sub-signal representing the main vibration characteristics of the cantilever beam for phase space reconstruction and normalization includes:

Preferably, stationary wavelet containing a main frequency range of structural vibration is transformed into an approximate coefficient to be taken as the multi-scale sub-signal representing the main vibration characteristics of the structure, and the multi-scale sub-signal is denoted as the multi-scale sub-signal s after boundary truncation;

Preferably, phase space reconstruction is performed on the multi-scale sub-signal s after truncation to obtain the multi-scale reconstructed attractor; and the multi-scale reconstructed attractor is normalized to make a value range of phase space dimensions being [0,1].

Preferably, in the boundary truncation of the multi-scale sub-signal, boundary truncation length of left and right sides of the multi-scale sub-signal is 1% of total length of the sub-signal.

Preferably, the phase space reconstruction of the multi-scale sub-signal s includes:

phase point coordinates in the reconstructed attractor Y are calculated according to the following formulation:

$$y_k = (s_k, s_k+\tau, \ldots, s_k+(m-1)\tau)$$

where, $y_k$ represents the $k^{th}$ phase point in the reconstructed attractor Y, $s_k$ represents amplitude of the $k^{th}$ signal of the multi-scale sub-signal after truncation, and m and T are embedding dimension and delay time of embedding parameters;

A covariance matrix C of the reconstructed attractor Y is calculated:

$$C=Y^T Y$$

Eigenvalue decomposition is performed on the covariance matrix C:

$$C=\Phi\Lambda\Phi^{-1}$$

where, $\Phi$ is a square matrix listed as a characteristic vector, and $\Lambda$ is a diagonal matrix whose principal diagonal elements are eigenvalues;

the reconstructed attractor Y is obtained by being projected along a first principal direction:

$$Z=Y\Phi$$

Z is the multi-scale reconstructed attractor obtained by phase space reconstruction.

Preferably, the embedding parameters of phase space reconstruction are m=2, and τ=1.

Preferably, construction of the multifractal spectrum includes:
  the total number of phase points of the multi-scale reconstructed attractor Z is counted, and denoted as M;
  a preset weight factor sequence qV and a grid size sequence sV;
  for each grid size $sV_m$, the multi-scale reconstructed attractor Z is divided into grids having a size of $G_m \times G_m$, the number of phase points in each grid is counted, and denoted as $g_{m,ij}$, where $sV_m$ represents the $m^{th}$ element of sV, and $G_m$ represents the number of grids when the grid size is $sV_m$;
  the percentage of the number of phase points in each grid to the total number of phase points is calculated:

$$p_{m,ij}=g_{m,ij}/M\times 100\%$$

intermediate variables are calculated:

$$NN_{mt} = \sum_i \sum_j p_{m,ij}^{q_t}$$

$$\mu_{mt,ij} = p_{m,ij}^{q_t}/NN_{mt}$$

$$Mf_{mt}=\Sigma_i\Sigma_j[\mu_{mt,ij}\cdot\log_{10}(p_{mt,ij})]$$

$$Mf_{mt}=\Sigma_i\Sigma_j[\mu_{mt,ij}\cdot\log_{10}(\mu_{mt,ij})]$$

$$Msc=-\log_{10}(sV)$$

where, $q_t$ represents the $t^{th}$ element of qV;
by linear regression coefficients of $Ma_{mt}$ and $Mf_{mt}$ with Msc separately, variable matrices $a_q$ and $f_q$ of the singularity index are determined; and
the multifractal spectrum of the multi-scale reconstructed attractor represented by f–α is obtained.

Preferably, the preset weight factor sequence qV and a grid size sequence are separately: qV=−2:0.2:2, sV=2:1:8.

Preferably, a calculation method for the damage index is as follows:

$$\lambda = \frac{(\Delta\alpha_r + \Delta\alpha_l)\Delta\alpha_r}{\Delta\alpha_l}$$

$$\kappa = \frac{(\Delta f_r - \Delta f_l)\Delta f_r}{\Delta f_l}$$

in which:

$$\Delta\alpha_r=\alpha_{max}-\alpha_{q=0}$$

$$\Delta\alpha_l=\alpha_{q=0}-\alpha_{min}$$

$$\Delta f_r=f_{max}-f_{min,r}$$

$$\Delta f_l=f_{max}-f_{min,r}$$

where, $\alpha_{max}$, $\alpha_{min}$, $\alpha_{q=0}$, $f_{max}$, $f_{min,r}$, $f_{min,l}$ correspond to values of α and f at endpoints and vertices separately in the multifractal spectrum represented by f–α.

Preferably, the step of identifying and locating the damage of the cantilever beam according to the relative numerical value of the damage index includes:

$$MFID = \frac{\lambda - \bar{\lambda}}{\sigma_\lambda}\frac{\kappa - \bar{\kappa}}{\sigma_\kappa}$$

MFID represents a relative value of a singularity damage index of the multifractal spectrum, λ and κ represent damage characteristic vectors composed of damage indexes λ and κ separately, $\bar{\lambda}$ and $\bar{\kappa}$ represent mean values of the damage characteristic vectors λ and κ separately, and $\sigma_\lambda$ and $\sigma_\kappa$ represent standard deviations of the damage characteristic vectors λ and κ separately.

The present invention has the beneficial effects:

The present invention provides the damage identification method for cantilever beam based on multifractal spectrum of multi-scale strange attractor, the method separates a damage information part and a noise part in a vibration signal by means of multi-scale analysis, quantitatively describes influence of damage on nonlinear dynamic motions of a structure by means of multifractal analysis, and then establishes a damage index based on multifractal characteristics of a multi-scale reconstructed attractor to evaluate health state of a beam structure and locate the structural damage. Compared with existing methods, a method for a multifractal spectrum of a multi-scale reconstructed attractor established by the present invention breaks through the problems of low identification accuracy, weak damage sensitivity and insufficient anti-noise ability of a damage characterization method for a cantilever beam in the prior art, and provide the simple, rapid and accurate damage identification method for cantilever beams.

DETAILED DESCRIPTION OF THE EMBODIMENTS

Figure 1:
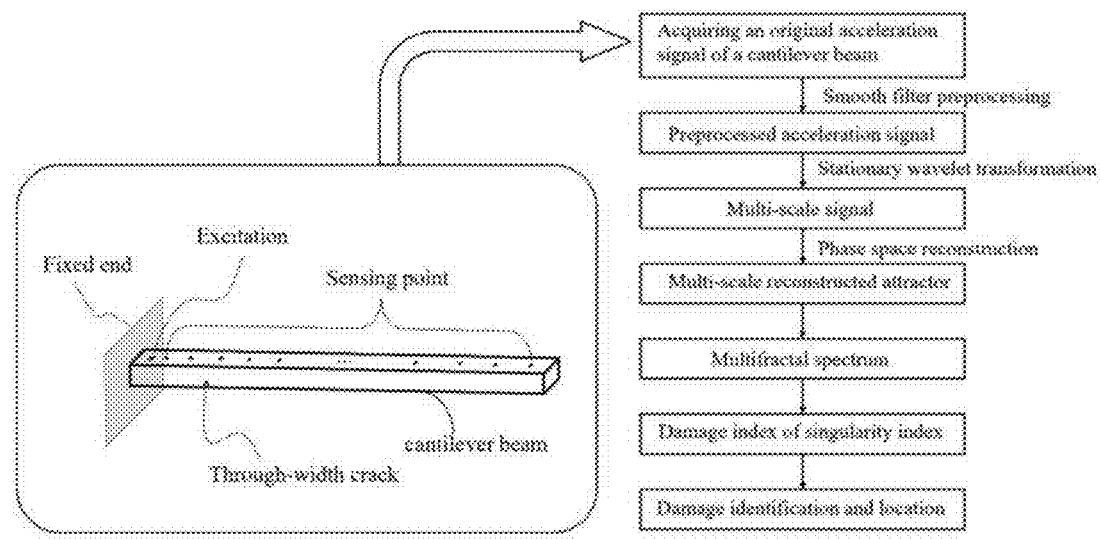
FIG. 1 is a schematic flowchart of a method in an example of the presented invention.

In order to make the objective, technical solution and advantages of the present invention clearer and more specific, the present invention will be further described in detail bellow with reference to accompanying drawings and examples. It should be understood that the specific examples described herein are merely illustrative of the present invention and is not intended to limit the present invention.

Example 1

The present invention provides a damage identification method for a cantilever beam based on a multifractal spectrum of a multi-scale reconstructed attractor. As shown in FIGS. 1-7:

S1: acquiring an acceleration signal of the cantilever beam by a dynamic measurement system, the acceleration signal is denoted as $x=\{x^i\}$, $i=1, 2, \ldots, N$, and N is data length.

S2: performing smooth filter preprocessing on the original acceleration signal to obtain a preprocessed acceleration signal, which is denoted as $a=\{a^i\}$, and a corresponding MATLAB function command for smooth filter preprocessing is "smooth".

S3: performing stationary wavelet decomposition on the preprocessed acceleration signal a to obtain multi-scale sub-signals having the same data length. The corresponding MATLAB function command for stationary wavelet decomposition is "swt", a wavelet basis function is "rbio2.4", and the wavelet decomposition level is 3.

S4: selecting the multi-scale sub-signal that may represent main vibration characteristics of the cantilever beam for phase space reconstruction and normalization to obtain a normalized multi-scale reconstructed attractor, which specifically includes:

S4.1: transforming stationary wavelet containing a main frequency range of structural vibration into an approximate coefficient to be taken as the multi-scale sub-signal representing the main vibration characteristics of the structure, and denoting the multi-scale sub-signal as the multi-scale sub-signal s after boundary truncation; and boundary truncation length of left and right sides of the multi-scale sub-signal being 1% of total length of the sub-signal.

S4.2: performing phase space reconstruction on the multi-scale sub-signal s after truncation to obtain the multi-scale reconstructed attractor.

S4.2.1: calculating phase point coordinates in the reconstructed attractor Y according to the following formulation:

$$y_k = (s_k, s_k+\tau, \ldots, s_k+(m-1)\tau)$$

where, $y_k$ represents the $k^{th}$ phase point in the reconstructed attractor Y, $s_k$ represents amplitude of the $k^{th}$ signal of the multi-scale sub-signal after truncation, and m and τ are embedding dimension and delay time of embedding parameters; and the embedding parameters of phase space reconstruction are m=2, and τ=1.

S4.2.2: calculating a covariance matrix C of the reconstructed attractor Y:

$$C = Y^T Y \quad (2)$$

S4.2.3: performing eigenvalue decomposition on the covariance matrix C:

$$C = \Phi \Lambda \Phi^{-1} \quad (3)$$

where, Φ is a square matrix listed as a characteristic vector, and Λ is a diagonal matrix whose principal diagonal elements are eigenvalues.

S4.2.4: obtaining the reconstructed attractor Y by being projected along a first principal direction:

$$Z = Y\Phi \quad (4)$$

Z is the multi-scale reconstructed attractor obtained by phase space reconstruction.

S4.3: performing normalization on the multi-scale reconstructed attractor to make a value range of phase space dimensions being [0,1].

S5: constructing the multifractal spectrum of the multi-scale reconstructed attractor, and establishing a damage index according to a singularity index of the multifractal spectrum. The step specifically includes:

S5.1: counting the total number of phase points of the multi-scale reconstructed attractor Z, and denoting the phase points as M.

S5.2: a preset weight factor sequence qV and a grid size sequence sV; the preset weight factor sequence qV and the grid size sequence being separately: qV=–2:0.2:2, sV=2:1:8.

S5.3: for each grid size sVnt, dividing the multi-scale reconstructed attractor Z into grids having a size of $G_m \times G_m$, counting the number of phase points in each grid, and denoting the number as $g_{m,ij}$, in which $sV_m$ represents the $m^{th}$ element of sV, and $G_m$ represents the number of grids when the grid size is $sV_m$;

S5.4: calculating the percentage of the number of phase points in each grid to the total number of phase points:

$$p_{m,ij} = g_{m,ij}/M \times 100\% \quad (5)$$

S5.5: calculating intermediate variables:

$$NN_{mt} = \sum_i \sum_j p_{m,ij}^{q_t} \quad (6)$$

$$\mu_{mt,ij} = p_{m,ij}^{q_t}/NN_{mt} \quad (7)$$

$$Ma_{mt} = \Sigma_i \Sigma_j [\mu_{mt,ij} \cdot \log_{10}(p_{m,ij})] \quad (8)$$

$$Mf_{mt} = \Sigma_i \Sigma_j [\mu_{mt,ij} \cdot \log_{10}(\mu_{mt,ij})] \quad (9)$$

$$Msc = -\log_{10}(sV) \quad (10)$$

where, $q_t$ represents the $t^{th}$ element of qV;

S5.6: by linear regression coefficients of $Ma_{mt}$ and $Mf_{mt}$ with Msc separately, determining variable matrices $a_q$ and $f_q$ of the singularity index; and S5.7: plotting the multifractal spectrum of the multi-scale reconstructed attractor represented by f–α.

S5.8: establishing the damage index based on the singularity index of the multifractal spectrum;

$$\lambda = \frac{(\Delta\alpha_r + \Delta\alpha_l)\Delta\alpha_r}{\Delta\alpha_l} \quad (11)$$

$$\kappa = \frac{(\Delta f_r - \Delta f_l)\Delta f_r}{\Delta f_l} \quad (12)$$

in which:

$\Delta\alpha_r = \alpha_{max} - \alpha_{q=0}$ $\Delta\alpha_l = \alpha_{q=0} - \alpha_{min}$ $\Delta f_r = f_{max} - f_{min,r}$ $\Delta f_l = f_{max} - f_{min,l}$ where, $\alpha_{max}$, $\alpha_{min}$, $\alpha_{q=0}$, $f_{max}$, $f_{min,r}$, $f_{min,l}$ correspond to values of $\alpha$ and f at endpoints and vertices separately in the multifractal spectrum represented by f–α.

S6: identifying and locating the damage of the cantilever beam according to the relative numerical value of the damage index. The step specifically includes:

$$MFID = \frac{\lambda - \overline{\lambda}}{\sigma_\lambda} \frac{\kappa - \overline{\kappa}}{\sigma_\kappa} \quad (13)$$

MFID represents a relative value of a singularity damage index of the multifractal spectrum, M and κ represent damage characteristic vectors composed of damage indexes λ and κ separately, $\overline{\lambda}$ and $\overline{\kappa}$ represent mean values of the damage characteristic vectors λ and κ separately, and $\sigma_\lambda$ and $\sigma_\kappa$ represent standard deviations of the damage characteristic vectors λ and κ separately.

In the present example,
in order to verify effectiveness of the damage identification method for cantilever beam based on a multifractal spectrum of a multi-scale reconstructed attractor, a physical model experiment is performed to extract acceleration response of the cantilever beam for analysis.

The overall flow of the method of the present invention refers to FIG. 1. In the present example, a geometric dimension of a beam structure is length×height×width=0.38×0.01×0.02 m³; physical parameters are: elastic modulus is 1.93×10¹¹ Pa, Poisson's ratio is 0.29, and material density is 7750 kg/m³; a boundary condition is that one end is fixed, and the other end is free; simple harmonic load is 10 mm from a fixed end; a damage position is 72 mm from the fixed end; and 11 acceleration sensors are provided along a length direction of the cantilever beam, a sampling frequency is 12800 Hz, and an analysis frequency is 5000 Hz. The acquired acceleration signal is denoted as x, as shown by a discrete point in FIG. 2.

Figure 2:
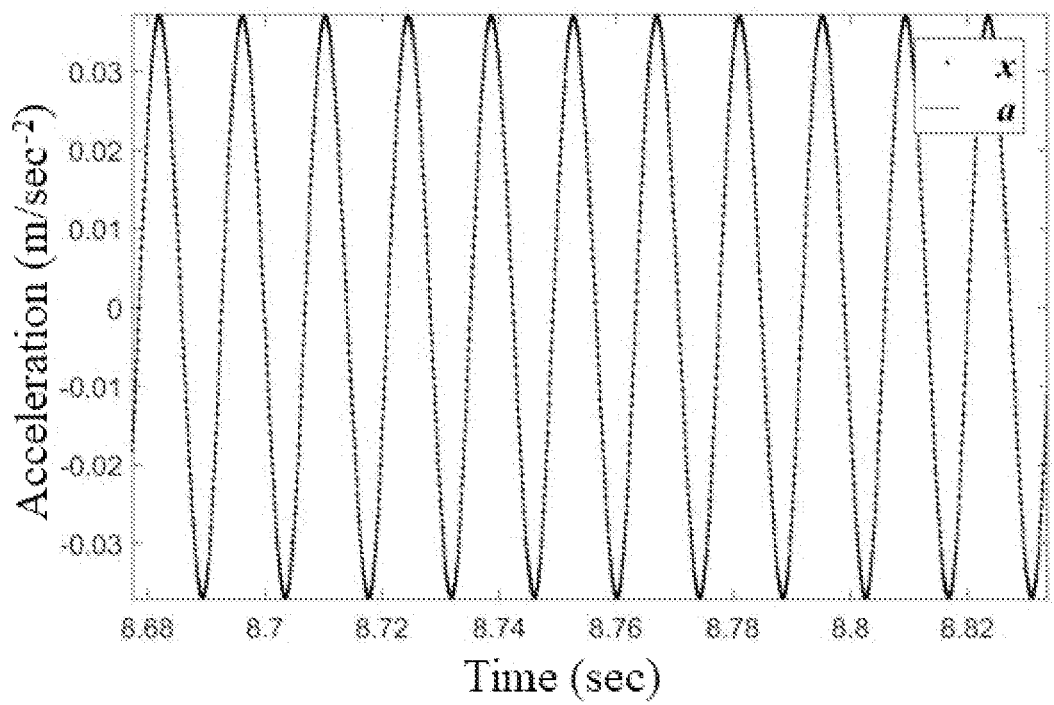
FIG. 2 shows acceleration response signals x and a of a cantilever beam before and after smoothing process in the example of the present invention.
Figure 3:
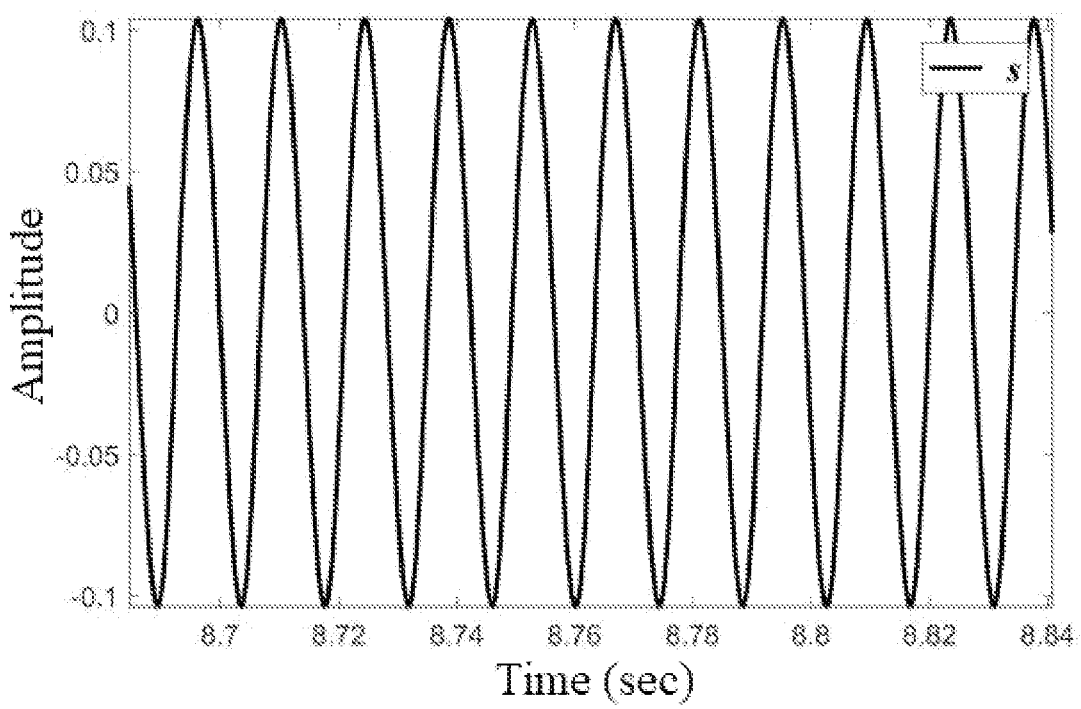
FIG. 3 is a time domain diagram of a stationary wavelet transformed into a multi-scale sub-signal s in the example of the present invention.
Figure 4:
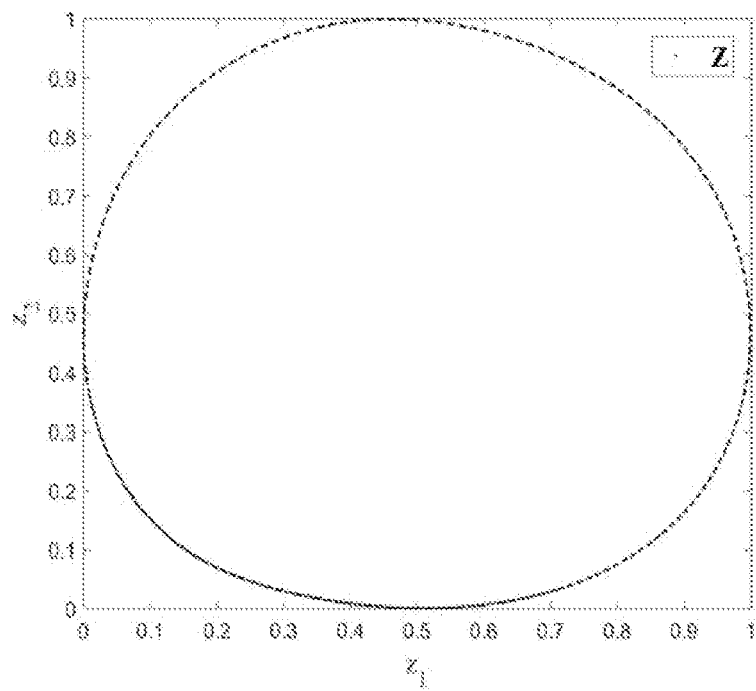
FIG. 4 is a schematic diagram of a multi-scale reconstructed attractor Z in the example of the present invention.
Figure 5:
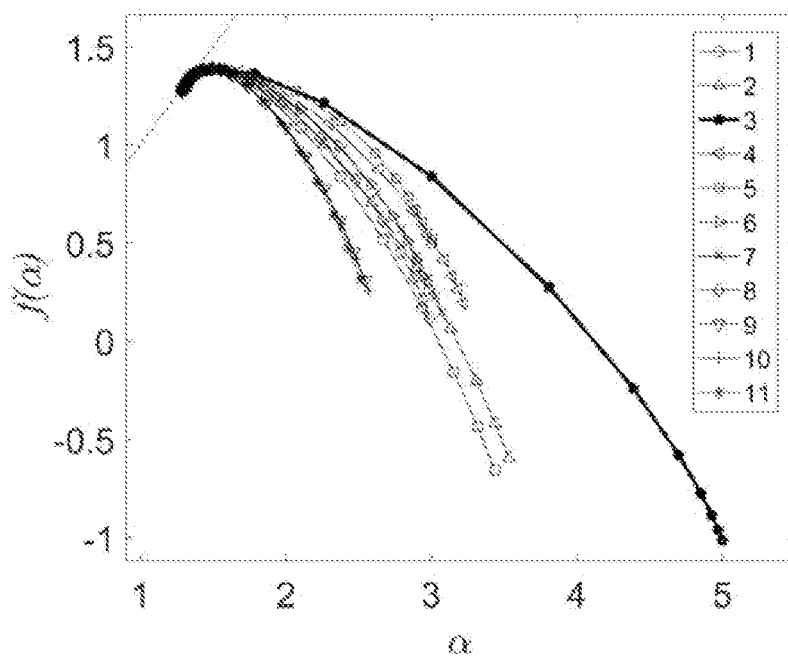
FIG. 5 is a multifractal spectrum represented by f–α at different measuring points of the cantilever beam in the example of the present invention.
Figure 6:
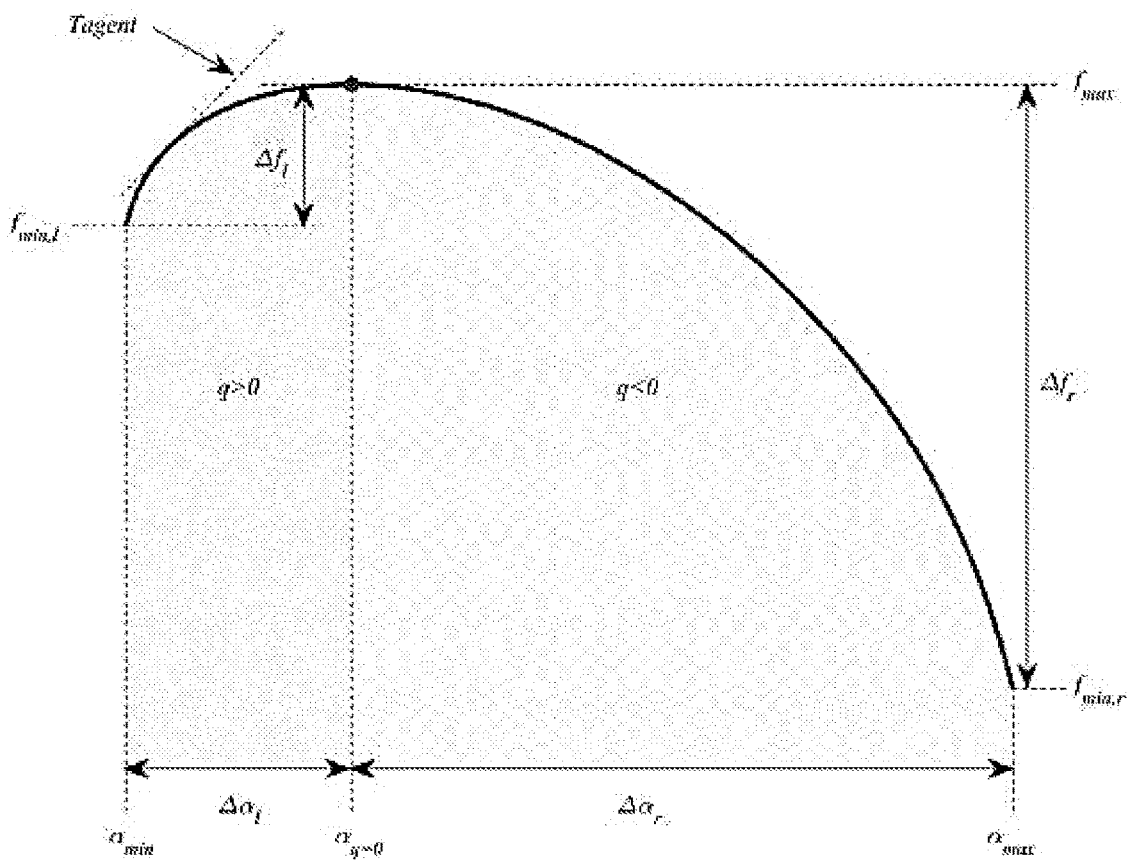
FIG. 6 is a schematic diagram of singularity parameter variables of the multifractal spectrum used for calculating a damage index in the example of the present invention.
Figure 7:
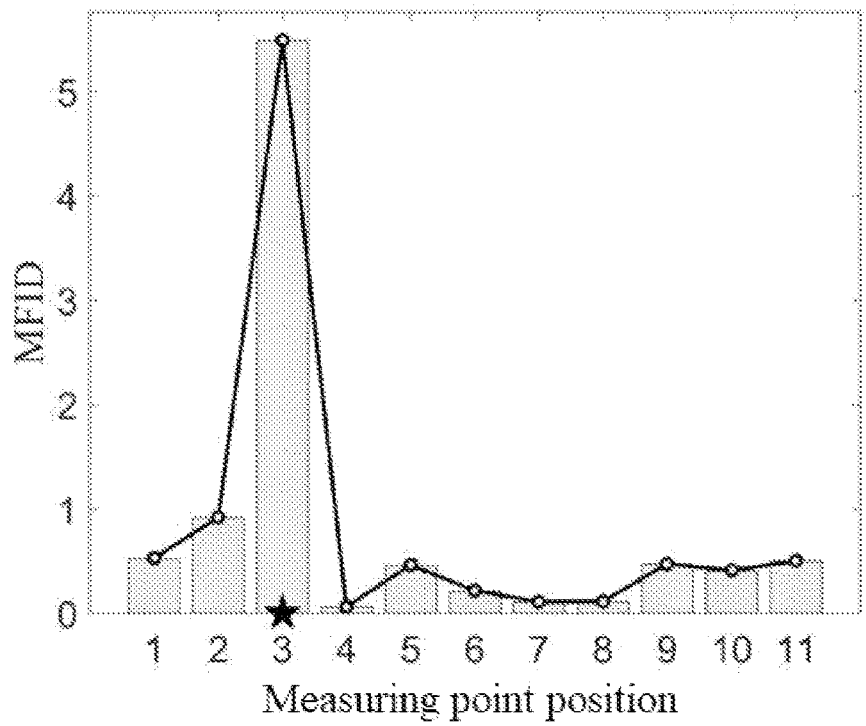
FIG. 7 is a damage identification result of the cantilever beam based on the multifractal spectrum of the multi-scale reconstructed attractor in the example of the present invention.

Smooth filter processing is performed on the original acceleration signal x, and the smoothed acceleration signal a is obtained by the MATLAB function command of "smooth", as shown by a solid line in FIG. 2. The wavelet basis function is selected to be "rbio2.4", the wavelet decomposition level is 3, stationary wavelet decomposition is performed on the smoothed acceleration signal a, the corresponding MATLAB function command is "swt", and the multi-scale sub-signal without downsampling is obtained. Stationary wavelet containing a main frequency range of structural vibration is transformed into an approximate coefficient to be taken as the multi-scale sub-signal representing the main vibration characteristics of the structure, and the multi-scale sub-signal is denoted as the multi-scale sub-signal s after boundary truncation, as shown in FIG. 3. The embedding parameters are m=2, τ=1, according to Eqs. (1)-(4), phase space reconstruction is performed on the multi-scale sub-signal s after truncation to obtain the multi-scale reconstructed attractor Z, as shown in FIG. 4. The preset weight factor sequence qV and the grid size sequence sV are that qV=−2:0.2:2, sV=2:1:8, the intermediate variables of the multifractal spectrum are calculated according to Eqs. (5)-(10), and the multifractal spectrum of the multi-scale reconstructed attractor represented by f–α at different measuring points, as shown in FIG. 5. According to Eqs. (11)-(13), the damage index of the multifractal spectrum MFID at each measuring point is calculated, the used intermediate variables of the singularity parameters are shown in FIG. 6, a calculation result of MFID is shown in FIG. 7, it may be seen that a MFID value at the measuring point 3 is the largest, indicating that damage may occur at point 3, which is consistent with an actual damage position. Therefore, the method for a multifractal spectrum of a multi-scale reconstructed attractor established by the present invention may effectively identify and locate the damage of the cantilever beam, breaks through the problems of low identification accuracy, weak damage sensitivity and insufficient anti-noise ability of the damage characterization method for a cantilever beam in the prior art, and provide the simple, rapid and accurate damage identification method for cantilever beams.

The above examples are merely preferred examples of the present invention, but not intended to limit the present invention, and any modifications, equivalent replacements, improvements, etc. made within the spirit and principles of the disclosure should fall within the scope of protection of the present invention.

What is claimed is:

1. A damage identification method for a cantilever beam based on a multifractal spectrum of a multi-scale reconstructed attractor, comprising:
acquiring an original acceleration signal of the cantilever beam by a dynamic measurement system, and performing smooth filter preprocessing on the original acceleration signal to obtain a preprocessed acceleration signal;
performing stationary wavelet decomposition on the preprocessed acceleration signal to obtain multi-scale sub-signals having the same data length;
selecting a multi-scale sub-signal representing vibration characteristics of the cantilever beam for phase space reconstruction and normalization to obtain the multi-scale reconstructed attractor;
forming the multifractal spectrum according to the multi-scale reconstructed attractor;
obtaining a damage index according to a singularity index of the multifractal spectrum; and
locating a damage position in the cantilever beam according to a relative numerical value of the damage index;
wherein the step of selecting the multi-scale sub-signal representing the vibration characteristics of the cantilever beam for phase space reconstruction and normalization comprises:
transforming a stationary wavelet containing a main frequency range of structural vibration into an approximate coefficient to be taken as the multi-scale sub-signal representing main vibration characteristics of a structure, and performing boundary truncation on the multi-scale sub-signal to obtain a multi-scale sub-signal s;

performing phase space reconstruction on the multi-scale sub-signal s after the boundary truncation to obtain the multi-scale reconstructed attractor; and normalizing the multi-scale reconstructed attractor to make a value range of phase space dimensions being [0,1].

2. The damage identification method according to claim 1, wherein when stationary wavelet decomposition is performed on the preprocessed acceleration signal, a wavelet basis function is rbio2.4, and the wavelet decomposition level is 3.

3. The damage identification method according to claim 1, wherein in the boundary truncation of the multi-scale sub-signal, a boundary truncation length of left and right sides of the multi-scale sub-signal is 1% of a total length of the multi-scale sub-signal.

4. The damage identification method according to claim 1, wherein the phase space reconstruction of the multi-scale sub-signal s comprises:

calculating phase point coordinates in the reconstructed attractor Y according to the following formulation:

$$y_k = (s_k, s_k + \tau, \ldots s_k + (m-1)\tau)$$

wherein, $y_k$ represents the $k^{th}$ phase point in the reconstructed attractor Y, $s_k$ represents amplitude of the $k^{th}$ signal of the multi-scale sub-signal after truncation, and m and $\tau$ are embedding dimension and delay time of embedding parameters;

calculating a covariance matrix C of the reconstructed attractor Y:

$$C = Y^\tau Y;$$

performing eigenvalue decomposition on the covariance matrix C:

$$C = \Phi \wedge \Phi^{-1}$$

wherein, $\Phi$ is a square matrix listed as a characteristic vector, and $\wedge$ is a diagonal matrix whose principal diagonal elements are eigenvalues; and obtaining the reconstructed attractor Y by being projected along the first principal direction:

$$Z = Y\Phi$$

wherein Z is the multi-scale reconstructed attractor obtained by phase space reconstruction.

5. The damage identification method according to claim 4, wherein the embedding parameters of phase space reconstruction are m=2 and $\tau$=1.

6. The damage identification method according to claim 1, wherein construction of the multifractal spectrum comprises:

counting the total number of phase points of the multi-scale reconstructed attractor Z, and denoted as M;

presetting a weight factor sequence qV and a grid size sequence sV;

for each grid size $sV_m$, dividing the multi-scale reconstructed attractor Z into grids having a size of $G_m \times G_m$, counting the number of phase points in each grid, and denoted as $g_{m,ij}$, where $SV_m$ represents the m-th element of sV, and $G_m$ represents the number of grids when the grid size is $sV_m$;

calculating the percentage of the number of phase points in each grid to the total number of phase points:

$$p_{m,ij} = g_{m,ij}/M \times 100\%$$

calculating intermediate variables as follows:

$$NN_{mt} = \sum_i \sum_j p_{m,ij}^{q_t}$$

$$\mu_{mt,ij} = p_{m,ij}^{q_t}/NN_{mt}$$

$$Ma_{mt} = \Sigma_i \Sigma_j [\mu_{mt,ij} \cdot \log_{10}(p_{m,ij})]$$

$$Mf_{mt} = \Sigma_i \Sigma_j [\mu_{mt,ij} \cdot \log_{10}(\mu_{mt,ij})]$$

$$Msc = -\log_{10}(sV)$$

wherein, $q_t$ represents the $t^{th}$ element of qV; and according to linear regression coefficients of $Ma_{mt}$ and $Mf_{mt}$ with Msc separately, determining variable matrices $\alpha_q$ and $f_q$ of the singularity index; and obtaining the multifractal spectrum of the multi-scale reconstructed attractor represented by f–α.

7. The damage identification method according to claim 6, wherein the preset weight factor sequence qV and the grid size sequence sV are: qV=−2:0.2:2, and sV=2:1:8 separately.

8. The damage identification method according to claim 1, wherein calculating the damage index comprises:

$$\lambda = \frac{(\Delta \alpha_r + \Delta \alpha_l)\Delta \alpha_r}{\Delta \alpha_l}$$

$$\kappa = \frac{(\Delta f_r - \Delta f_l)\Delta f_r}{\Delta f_l}$$

wherein, $$\Delta \alpha_r = \alpha_{max} - \alpha_{q=0}$$

$$\Delta \alpha_l = \alpha_{q=0} - \alpha_{min}$$

$$\Delta f_r = f_{max} - f_{min,r}$$

$$\Delta f_l = f_{max} - f_{min,r}$$

wherein, $\alpha_{max}$, $\alpha_{min}$, $\alpha_{q=0}$, $f_{max}$, $f_{min,r}$, $f_{min,l}$ correspond to values of $\alpha$ and f at endpoints and vertices separately in the multifractal spectrum represented by f–α.

9. The damage identification method according to claim 1, wherein the step of identifying and locating the damage of the cantilever beam according to the relative numerical value of the damage index comprises:

$$MFID = \frac{\lambda - \overline{\lambda}}{\sigma_\lambda} \frac{\kappa - \overline{\kappa}}{\sigma_\kappa}$$

wherein, MFID represents a relative value of a singularity damage index of the multifractal spectrum, $\lambda$ and $\kappa$ represent damage characteristic vectors composed of damage indexes $\lambda$ and $\kappa$ separately, $\overline{\lambda}$ and $\overline{\kappa}$ represent mean values of the damage characteristic vectors $\lambda$ and $\kappa$ separately, and $\sigma_\lambda$ and $\sigma_\kappa$ represent standard deviations of the damage characteristic vectors $\lambda$ and $\kappa$ separately.

* * * * *